Oct. 6, 1942.   G. L. RINGLAND   2,298,022
ADJUSTABLE END PLAY MOTOR
Filed Aug. 2, 1940
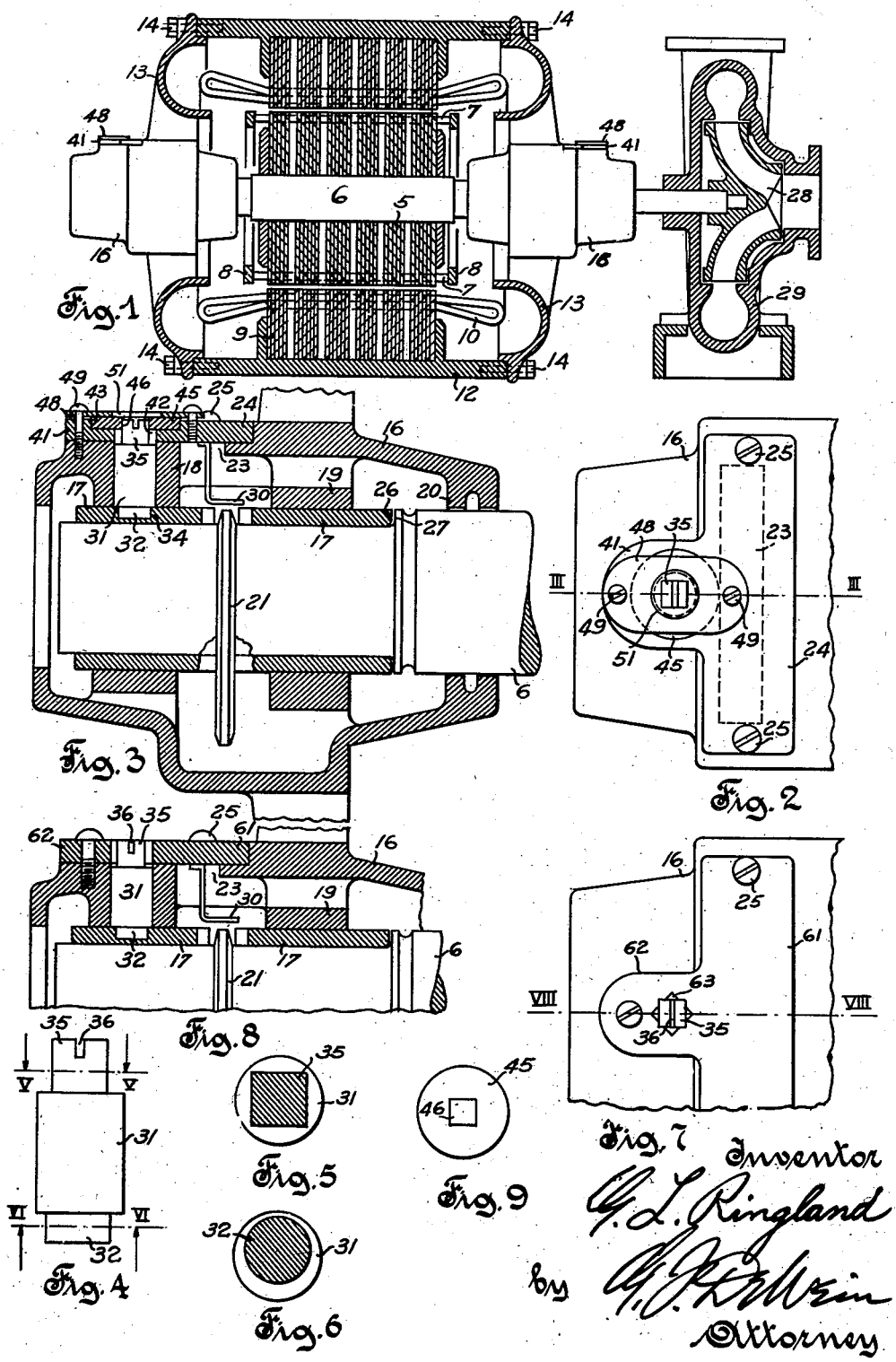

Patented Oct. 6, 1942

2,298,022

UNITED STATES PATENT OFFICE 2,298,022

ADJUSTABLE END PLAY MOTOR

George L. Ringland, Norwood, Ohio, assignor to Allis-Chalmers Manufacturing Company, Milwaukee, Wis., a corporation of Delaware Application August 2, 1940, Serial No. 349,472

10 Claims. (Cl. 308—58)

This invention relates in general to motors, such as are used for driving other apparatus, and it has particular advantages or applicability in connection with electric motors, such as are used for driving pumps, fans and other classes of rotating machinery.

Where motors are used for driving pumps, fans and other rotating apparatus wherein there is a definite requirement for securing and maintaining more or less exact or definite clearances or alinement between rotating and stationary parts or it is desirable to avoid appreciable end play in the motor or the driven apparatus, it is highly desirable to provide a simple form of readily accessible and adjustable means for securing desired axial adjustment of the rotating element and holding such adjustment during normal operation, or until wear of parts may indicate the desirability of further adjustment, and which, in the event further adjustment becomes desirable, will permit such further adjustment to be effected with minimum effort and minimum interference with the useful operation of the motor or apparatus driven thereby.

The present invention contemplates as a feature thereof the incorporation in the design of a driving motor, such as an electric motor of the induction or other type, a readily accessible and manipulable device for axially adjusting the position of the shaft or rotor of the motor and any element driven thereby, or the position of one or more end bearing or abutment devices, to establish desired operating clearances or limit end play of the rotor, and a simple embodiment of the invention includes the incorporation of such devices in the bearing supports for the motor, at a point most convenient for manipulation without disassembling the motor. A preferred embodiment of the invention is one wherein an eccentric element, accessible for manipulation from the outer side of the bearing housing of the motor, cooperates with the bearing sleeve to hold the latter in desired adjustable position wherein an abutment thereon may cooperate with an abutment on the motor shaft to maintain desired clearances between these parts and limit permissible end play of the rotor.

It is an object of the present invention to provide an improved design and construction of rotating apparatus, including a device for adjustably determining the axial clearance and permissible end play of the rotating element of the apparatus relative to the stationary element thereof, and effectively maintaining the parts in desired adjusted condition.

It is the further object of the present invention to provide an improved design and construction of motor wherein provisions for obtaining and maintaining desired axial clearance and permissible end play of the rotor are incorporated in the motor in association with the bearing structure thereof.

It is the further object of the present invention to provide an improved design and construction of electric motor having associated with one or both bearing housings thereof a novel design and arrangement of an eccentric actuator for adjusting the bearing sleeve of the motor to determine and maintain desired axial clearance and permissible end play of the rotor relative to the stator of the motor.

These and other objects and advantages are attained by the present invention, various novel features of which will be apparent from the description herein and the accompanying drawing, disclosing embodiments of the invention, and will be more particularly pointed out in the annexed claims.

In the accompanying drawing:

Fig. 1 is a view generally in vertical section of an electric motor drive for a rotating machine and embodying features of the present invention;

Fig. 2 is a fragmental plan view of a portion of the motor of Fig. 1;

Fig. 3 is an enlarged fragmental vertical section of a portion of the motor of Figs. 1 and 2, the plane of section being that of the line III—III of Fig. 2;

Fig. 4 is a side elevation of a detail of Fig. 1;

Fig. 5 is a sectional plan view in the plane of the line V—V of Fig. 4;

Fig. 6 is a sectional plan view in the plane of the line VI—VI of Fig. 4;

Fig. 7 is a view similar to Fig. 2 and illustrative of a modification of the detail of Figs. 1 and 2;

Fig. 8 is a fragmental sectional elevation in the plane of line VIII—VIII of Fig. 7; and Fig. 9 is a plan view of a detail of Figs. 2 and 3.

In the embodiment of the invention illustrated, a motor, of the induction type, includes a rotor core 5 fixed to a shaft 6 and provided with a winding 7 of the squirrel-cage type having short-circuiting end rings 8. The rotor is mounted for rotation radially within a stator core 9 provided with a conventional primary winding 10. The stator core is mounted within a frame or housing 12. The motor may be supported on a base through the stator frame directly or through end brackets or housings 13 detachably held in position with respect to the stator frame by means of bolts 14 passing through an outer rim portion of the end bracket or housing 13 and secured in threaded relation in the stator frame.

The end housings or brackets 13 carry bearing housings 16 within which journal portions, of reduced diameter, of the shaft 6 are rotatably mounted, each journal portion rotating within a bearing sleeve 17 carried by supporting portions 18, 19 of the housing, these supporting portions of the housing being bored to provide a close sliding fit for the bearing sleeve of the shaft. The laterally inner end of each bearing housing is correspondingly bored to receive the body portion of the motor shaft, as indicated at 20. The space between and about the supporting portions 18, 19 of the housing, at the lower half thereof, constitute an oil well of substantial dimensions in which an oil ring 21 dips, this oil ring occupying a slot in the upper portion of the bearing sleeve 17 and engaging with the exposed upper surface of the shaft, and thus serving to feed oil, during operation of the motor, to the bearing surfaces of the shaft and the sleeve. Access to the oil well or the space within the bearing housing is provided through an opening 23 in the upper and readily accessible outer side of the bearing housing, this opening being provided with a removable closure plate 24 cooperating with a cut-away seat on a portion of the housing, of extended length from front to rear, screws 25, entering the housing, serving to secure the cover plate in position.

In the conventional construction of motor, the bearing sleeves in which the motor shaft rotates, are usually fixed in position with respect to the bearing housing to provide a definite degree of end play between a flat machined abutment surface on the sleeve, usually at the end thereof, as indicated at 26, and a corresponding abutment surface 27 on the shaft, the sleeve being held in such position or so restrained as to its movement that the clearance between the abutment surfaces 26 and 27 is such as may be satisfactory for normal operation under average conditions for the majority of motor installations.

A retaining guard 30 for the oil ring 21, overlying the upper portion of the oil ring and adjacent portions of the bearing sleeve, may be mounted in position by securing the same to the under side of the cover plate, this guard thus being removable with the cover plate.

The motor is shown as being connected to drive a rotating machine of the character of a centrifugal pump or fan including a rotor 28, mounted on the motor shaft, or an extension thereof, within a casing 29 suitably supported in position.

In certain classes of motor drives, particularly where the motor drives a centrifugal pump or fan, it is often highly desirable that very small clearances or end play be permitted between the shaft and the stator of the motor, and, in many such cases, it is also desirable that provision be made for adjustment of such clearance to compensate for any wear that might have the effect of appreciably varying the clearance or end play beyond permissible limits, and generally to the end that it be possible to maintain any desired minimum clearance or end play. Through the incorporation of the present invention in motors, it is possible to adjust to and maintain any desired axial clearance or degree of permissible end play, thus accommodating the motor for driving any type of load.

As indicated in the drawing, a pin or spindle 31 having a cylindrical body portion fits and is rotatable, in close guided relation, in a correspondingly shaped opening in the bearing supporting portion 18 of the bearing housing; and this pin is insertable to position through the upper open end of the opening. The lower end 32 of this pin is of cylindrical form, but is disposed in eccentric relation with respect to the axis of the cylindrical body portion of the pin; and this lower eccentric portion 32 fits into a recess or aperture 34 in the upper side of the bearing sleeve 17 to thus maintain the latter in position. The upper end 35 of the pin 31 is preferably of square cross-section, and it is preferably provided with a slot 36 for reception of a screw driver or other tool for rotating the pin. The recess or aperture 34 in the bearing sleeve is preferably of only sufficient width, in the direction of the axis of the shaft, to provide an easy but close fit of the eccentric portion 32 within such aperture, and the dimension of the recess in a circumferential direction may be slightly greater than the diameter of the eccentric portion 32, to accommodate for the eccentric shape of the portion 32.

On rotating the pin 31, by means of a tool applied to the square head portion 35, the eccentric portion 32, through its coaction with the cooperative walls of the aperture 34 in the bearing sleeve, adjusts the latter axially to provide any desired clearance, from practically rubbing contact up to the maximum clearance determined by the eccentricity of the lower end portion 32 of the pin, between the end abutment surface 26 on the sleeve and the adjacent abutment surface 27 on the shaft.

The oil well cover plate 24 is provided with an end extension 41, fitted on a correspondingly shaped seat at the upper side of the bearing housing, and lying over the aperture in the housing occupied by the pin 31. This extension 41 on the cover plate is provided with an opening 42 through which the rectangular upper end 35 of the pin projects and within which this upper end portion 35 may be rotated. The upper face of the extension 41 is provided with an annular recess 43 about the opening 42 and concentric with the axis of rotation of the pin 31. An annular metal element or washer 45 fits into this recess 43 and is rotatable therein, preferably with a fairly close fit with the walls of the recess, this washer being slightly thicker than the depth of the recess 43, so that the upper surface of the washer projects slightly above the adjacent surface of the cover plate. This washer 45 is provided with a central aperture 46 of square outline and into which the square upper end portion 35 of the pin 31 fits with minimum permissible rotation relative to the washer.

With the washer 45 free to rotate in the recess 43 of the extension of the cover plate 24, the pin 31 may be rotated, carrying the washer along with it, to cause adjustment of the sleeve 17 to a position corresponding to desired clearance between the abutment surfaces 26 and 27 on the sleeve and the shaft, respectively. To hold the pin and the sleeve 17, associated therewith, in desired adjusted position, a clamping plate 48 is provided, this plate being slightly flexible, and, when drawn down against the upper surface of the washer 45 by means of securing screws 49 threaded into the oil well cover plate, it serves to hold the washer 45, through the forced engagement between the washer and the clamping plate and the bottom of the recess 43, against rotation. And as the pin 31 is interlocked with the washer through the cooperation of the square headed portion 35 on the pin with the sides of the square recess 46 in the washer, the pin 31 and the sleeve 17 are held in desired definite position of adjustment.

With the parts thus assembled, if it becomes desirable to change the clearance adjustment between the abutment surfaces 26 and 27 of the bearing sleeve and the shaft, respectively, one or both of the securing screws 49 of the clamping plate 48 may be backed off sufficiently to relieve the holding pressure on the washer 45; and the pin 31, with its eccentric sleeve-adjusting portion 32, may be adjusted by a screw driver or like tool inserted, through an aperture 51 in the plate 48, into the slot 36, on the head portion of the pin. When the desired readjustment is attained, the securing screws 49 are tightened to again bring the clamping plate 48 in clamping relation with the washer 45. It will be apparent that the oil well cover plate may be withdrawn from position, without affecting the adjustment of the pin 31, by removing the holding screws 25 and drawing the plate, and the washer 45 and clamping plate 48 along therewith, upwardly over the rectangular head 35 of the pin, the washer 45 being held in its definite position of adjustment corresponding to the adjusted position of the pin 31. The cover plate may be readily replaced in position by dropping the same over the rectangular head 35 of the pin 31, the latter being in the desired position of adjustment.

In Figs. 7 and 8, there is disclosed a modified form of a feature of the invention, wherein the oil well cover plate, indicated at 61, has its lateral extension 62 provided with an eight-pointed, star-shaped opening 63 of an outline such as may be formed by two superposed concentric squares, one being displaced at an angle of forty-five degrees from the other. The shape of this opening 63 is such that the square-headed portion 35 of the adjusting pin 31 will readily pass, with a fairly close fit, through the opening 62 in eight different positions of adjustment of the pin. With this arrangement, the pin 31 may be held in only eight definite positions of adjustment, instead of the unlimited number of positions permitted in the arrangement shown more particularly in Figs. 2 and 3. With the oil well cover plate 61 removed from the housing, the pin 31 may be adjusted, by a tool engaging the slot 36 in the head portion 35, to any particular one of the eight positions of adjustment provided for; and then the cover plate may be dropped over the head portion 35 of the pin 31, the cover plate being then fastened in position on the bearing housing through the securing screws therefor. With the oil well cover plate secured in position on the bearing housing, the end play or clearance adjusting pin is definitely held in adjusted position against rotation, through the side walls of the square headed portion 35 of the pin bearing against the particular group of side walls forming a corresponding rectangular figure; and the bearing sleeve 17 is thus held in desired position of adjustment.

Through the arrangements described hereinabove, the motor, when first assembled, may be subjected to an initial adjustment of the bearing sleeves 17 so as to substantially center the rotor of the motor with respect to the stator, to thus attain the relative positions of these parts corresponding to greatest efficiency and capacity of the motor. This may be done by suitable adjustment of one or both of the adjusting pins 31, with their eccentric lower ends 32 cooperative with the walls of the recesses 34 in the bearing sleeves. With the rotor thus centered, the pins 31 may then be adjusted to withdraw the abutment surfaces 26 on the sleeves from the abutment surfaces 27 on the shaft to a sufficient extent to provide the desired normal running clearance between the abutment surfaces 26 and 27. Where it is contemplated that the motor is to drive a load wherein only very limited end play is desirable, as occurs often in the case of fans, centrifugal pumps and the like, the bearing sleeves may be adjusted to provide minimum end play or clearance between the stationary and running surfaces 26 and 27, respectively. With the parts so adjusted, and the cover plate 24 and the clamping plate 48 of the device of Figs. 1, 2 and 3, or the cover plate 61 of the device of Figs. 7 and 8, secured in position as described hereinabove, the parts are maintained in their desired definite position of adjustment until such time as it may be desired to alter such adjustment.

By reason of the fact that the clearances at the two ends of the motor may be secured and maintained separately, it is possible to adjust the motor shaft axially, while also providing for desired clearances between the abutment surfaces 26 and 27, for the purpose of varying to a substantial extent the adjustment or clearance between a stationary element and a rotating element, such as indicated at 28 and 29, respectively, of a fan or like machine driven by the motor shaft or an extension thereof.

It will be apparent that through the present invention there is provided a motor having a simple design and construction of clearance or end play adjusting mechanism which adds little cost to the motor, but which provides maximum facility for adjusting and insuring desired end play or clearance in the operation of the motor for any particular driving operation to which the motor is to be put.

It should be understood that the invention claimed is not limited to the exact details of design and construction disclosed herein, for obvious modifications within the scope of the appended claims will be apparent to persons skilled in the art.

It is claimed and desired to secure by Letters Patent:

1. In combination in a motor, a stator, a rotor cooperative therewith and having a shaft, supporting bearing housings carrying bearings within which the rotor shaft is rotatably mounted, said shaft having an abutment surface at each side of the motor, said bearings each having a portion adjustable axially along said shaft and provided with an abutment surface in opposed relation to a corresponding one of said abutment surfaces on said shaft, means for axially adjusting each of said adjustable bearing portions to vary the clearance between the abutment surface thereon and the corresponding abutment surface on said shaft, said means comprising an element rotatable in an opening through said bearing housing and having an operating head of polygonal cross-section, an apertured plate removably held in position on said bearing housing over said opening with said polygonal head portion in said opening and having means cooperative with said polygonal head portion for securing the latter and said adjustable bearing portion in various adjusted positions.

2. In combination in a motor, a stator, a rotor cooperative therewith and having a shaft, supporting bearing housings carrying bearing sleeves within which the rotor shaft is rotatably mounted, said bearing housings being formed to provide oil wells about said bearing sleeves and open at the upper side of said bearing housings, said shaft having an abutment surface at each side of the motor, and said bearing sleeves each being adjustable axially along said shaft and provided with an abutment surface in opposed relation to a corresponding one of said abutment surfaces on said shaft, means for adjusting each of said bearing sleeves axially of the shaft to vary the clearance between the opposed abutment surfaces of said bearing sleeve and said shaft, said means comprising an element rotatable in guided relation in an opening in said bearing housing and having an outer portion of polygonal cross-section accessible through the upper side of said bearing housing, a cover plate for said oil well removably held in position on said bearing housing and including a portion cooperative with said polygonal head portion of said rotating element for securing the latter and said bearing sleeve in a plurality of adjusted positions at least as great in number as twice the number of side walls of said polygonal head portion.

3. In combination in a motor, a stator, a rotor cooperative therewith and having a shaft, supporting bearing housings carrying bearing sleeves within which the rotor shaft is rotatably mounted, said bearing housings providing oil wells about said bearing sleeves and open at the upper side of the bearing housings, said shaft having an abutment surface at each side of the motor, said bearing sleeves each being adjustable axially along said shaft and provided with an abutment surface in opposed relation to a corresponding one of said abutment surfaces on said shaft, means for axially adjusting each of said bearing sleeves to vary the clearance between the opposed abutment surfaces of the bearing sleeve and said shaft, said means comprising an element rotatably mounted in and guided by the walls of an opening in said bearing housing adjacent said oil well and having its axis of rotation extending transversely of the axis of said shaft and being provided adjacent its inner end with a cam portion eccentric with respect to the axis of said element and cooperative with portions of said bearing sleeve, said rotatable element being operative on rotation thereof to adjust said bearing sleeve axially to bring the abutment surface thereof into desired relation with respect to the adjacent abutment on said shaft, a cover plate removably held in position on said bearing housing over said oil well opening, said cover plate and the outer portion of said rotatable element being provided with cooperative complementary locking portions one of which is on one of said latter parts and a plurality of which are on the other of said parts, and said cover plate being effective to hold said rotatable element in any selected one of a plurality of operative positions when said cover plate is secured in operative position.

4. In combination in a motor, a stator, a rotor cooperative therewith and having a shaft, a supporting bearing housing carrying a bearing sleeve within which the rotor shaft is rotatably mounted, said shaft having an abutment surface thereon, and said bearing sleeve being axially adjustable in said bearing housing and provided with an abutment surface in opposed relation to said abutment surface on said shaft, a substantially radially extending element having a cylindrical portion rotatable in an opening in said bearing housing and having a cam-shaped portion having a guiding fit in a recessed portion of said bearing sleeve and operative to adjust the latter axially in either direction to vary the clearance between the abutment surfaces on said bearing sleeve and said shaft, and a plate removably held in position on the outer side of said bearing housing, the outer end of said rotatable element and said plate carrying cooperative portions serving to secure said rotatable element in any one of a plurality of positions of adjustment when said plate is secured in operative position on said housing.

5. In combination in a motor, a stator, a rotor cooperative therewith and having a shaft, a supporting bearing housing carrying a bearing sleeve within which the rotor shaft is rotatably mounted and provided with an oil well about said bearing sleeve, said shaft having an abutment surface thereon, and said bearing sleeve being axially adjustable in said bearing housing and provided with an abutment surface in opposed relation to said abutment surface on said shaft, an element rotatably disposed in a correspondingly shaped opening in said bearing housing and having a cam-shaped portion at its inner end having a guiding fit in a recessed portion of said bearing sleeve and operative to adjust the latter axially in either direction to vary the clearance between the abutment surfaces on said sleeve and said shaft, and a cover plate for said oil well removably held in position on the outer side of said bearing housing, said cover plate having a portion thereof extending over the opening in which said rotatable element is mounted and provided with a recess at its outer face, the axis of said recess coinciding with the axis of said rotatable element, a locking member rotatable in said recess, said locking member and the outer portion of said rotatable element being provided with interengaging portions for insuring rotation of said locking member along with said rotatable element, and means for clamping said locking member against rotation to thereby secure said rotatable element and said bearing sleeve in any one of a plurality of adjusted positions.

6. In combination in a motor, a stator, a rotor cooperative therewith and having a shaft provided with an abutment surface, a supporting bearing housing carrying an axially adjustable bearing sleeve within which said shaft is rotatably mounted and provided with an oil well about said bearing sleeve, said bearing sleeve carrying an abutment surface in opposed relation to said abutment surface on said shaft, a pin rotatable within said bearing housing and provided at its inner end with an eccentric cam-shaped portion operating in guided relation in an aperture in said bearing sleeve and operative on rotation of said pin to shift said bearing sleeve axially in either direction to vary the clearance between said abutment surfaces on said sleeve and said shaft, said rotatable pin having a portion of polygonal cross-section at its outer end, and a cover element for said oil well removably mounted on said bearing housing, said cover element having a portion overlying said rotatable pin and provided with an opening into which the polygonal outer end of said rotatable element passes, an annular recess in the outer face of said cover element and concentric about the axis of said pin, an annular washer in said recess, said washer having a central opening of substantially the same shape and size as the polygonal head portion of said rotatable pin and passing over the latter, and a removable clamping plate bearing upon the outer surface of said washer and operative when in secured position to hold said washer and said rotatable pin in adjusted position.

7. In combination in an electric motor, a stator, a rotor cooperative therewith and having a shaft, supporting bearing housings carrying bearing sleeves within which the rotor shaft is rotatably mounted, said shaft having an abutment surface at each side of the motor, said bearing sleeves each being positively axially adjustable in either direction in its housing and provided with an abutment surface in opposed relation to a corresponding abutment surface on said shaft, a rotatable element disposed in a correspondingly shaped guide opening in said bearing housing and provided with a cam-shaped portion at its inner end having a guiding fit in a recess in said bearing sleeve and operative to adjust the latter axially in either direction to center said rotor with respect to said stator and to vary the clearance between the abutment surfaces on said bearing sleeve and said shaft, the outer end of said rotatable element including a polygonal head, an element having a polygonal aperture therein and removably mounted on said bearing housing with the polygonal head portion of said rotatable element fitting in said apertured element, said apertured element when secured in operative position serving to hold said rotatable element and said bearing sleeve in any one of a plurality of adjusted positions.

8. In combination in a motor, a stator, a rotor cooperative therewith and having a shaft, supporting bearing housings carrying bearing sleeves within which the rotor shaft is rotatably mounted and forming oil wells about said shaft open at the upper side of said bearing housings, said shaft having an abutment surface at each side of the motor, said bearing sleeves each being axially adjustable relative to said shaft and provided with an abutment surface in opposed relation to a corresponding abutment surface on said shaft, a substantially radially extending element rotatable in an opening in said bearing housing adjacent the oil well opening therein and provided with an eccentric portion having a guiding fit in a recess in said bearing sleeve and operative on rotation of said rotatable element to positively adjust said bearing sleeve axially in either direction to aline said rotor with respect to said stator and provide desired clearance between the abutment surfaces on said bearing sleeve and said shaft, a cover for the opening to said oil well, said cover being removably secured on said bearing housing and having an aperture fitting over the outer end of said rotatable element, the outer portion of said rotatable element and the walls of the aperture in said cover being provided with cooperative engaging portions serving to hold said rotatable element in any one of a plurality of adjusted positions when said cover is secured in operative position on said bearing housing.

9. In combination in a motor, a stator, a rotor cooperative therewith and having a shaft, supporting bearing housings carrying therewithin bearings for said shaft, said bearings being movable axially with respect to said housings, said shaft having an abutment surface thereon at each side of the motor, said bearings each having an abutment surface in opposed relation to the corresponding one of said abutment surfaces on said shaft, an element having a cylindrical portion rotatably mounted in guided relation in an opening in said bearing housing and having a cam-shaped portion cooperative with spaced wall portions formed on said bearing and operative to adjust the latter axially in either direction to vary the clearance between the abutment surfaces on said bearing and said shaft, a cover element removably held in position on said housing over the opening therein occupied by said rotatable bearing-adjusting element, and the outer end of said rotatable element and said cover element carrying cooperative portions serving to fixedly secure said rotatable element in any one of a plurality of positions of adjustment, one of said cooperative portions being in the form of a projection and the other of said portions being in the form of adjacent walls forming a recess therebetween and within which said projection is disposed and held in position when said cover element is secured in operative position on said housing.

10. In combination in a motor, a stator, a rotor cooperative therewith and having a shaft, a supporting bearing housing carrying a bearing sleeve within which the rotor shaft is rotatably mounted, said shaft having an abutment surface thereon, and said bearing sleeve being axially adjustable in said bearing housing and provided with an abutment surface in opposed relation to said abutment surface on said shaft, a substantially radially extending element having a cylindrical portion rotatable in an opening in said bearing housing and having a portion eccentrically disposed with respect to the axis of said cylindrical portion and disposed between and cooperative with opposed surface portions of said bearing sleeve and operative on rotation of said rotatable element to adjust said bearing sleeve axially in either direction to vary the clearance between the abutment surfaces on said bearing sleeve and said shaft, and a securing element removably held in position on said bearing housing, the outer end of said rotatable element being of polygonal cross-section and said securing element carrying a portion cooperative with said polygonal outer end of said rotatable element and serving to fixedly secure the latter element in any one of a plurality of positions of adjustment when said securing element is in normal securing relation on said bearing housing.

GEORGE L. RINGLAND.